UNITED STATES PATENT OFFICE.

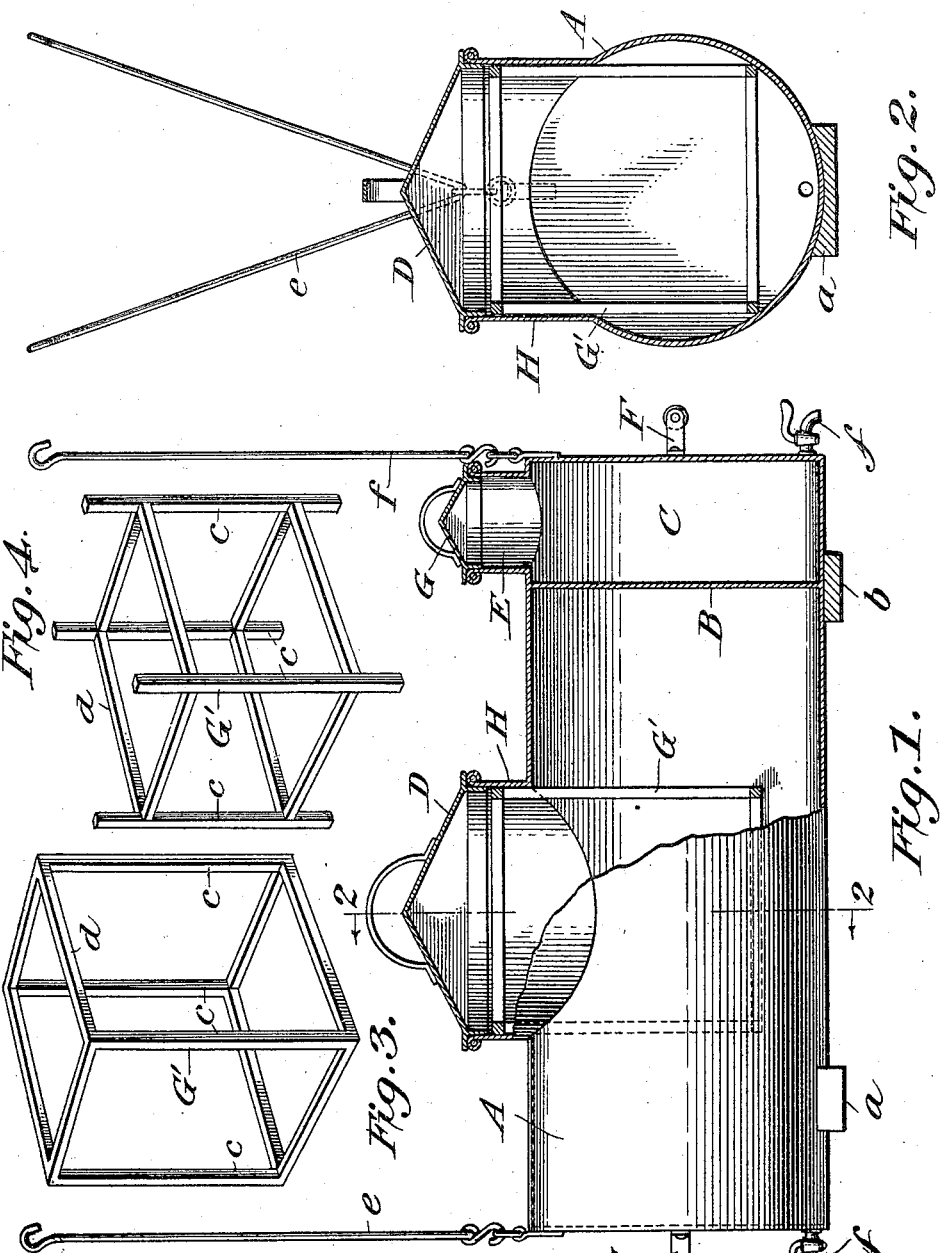

JOHN R. SIMS, OF BARNESVILLE, GEORGIA.

RECIPROCATING CHURN.

965,956. Specification of Letters Patent. Patented Aug. 2, 1910.

Application filed May 22, 1907. Serial No. 375,110.

*To all whom it may concern:*

Be it known that I, JOHN R. SIMS, a citizen of the United States, residing at Barnesville, in the county of Pike and State of Georgia, have invented certain new and useful Improvements in Reciprocating Churns, of which the following is a specification.

My invention relates to churns, more particularly to those of the suspended reciprocating type, and has for its object to provide a device of that character wherein the milk in the butter-making or churning compartment is thrown alternately against and away from the wall of an adjacent chamber containing a tempering liquid.

A further object of the invention is the provision of a removable dasher or breaker which when placed within the churn will tend to increase the agitation of the contents while the churn is being operated.

In the accompanying drawings, which illustrate one embodiment of my invention:—Figure 1 is a view partly in section and partly in elevation of the churn. Fig. 2 is a vertical cross section thereof taken on the line 2—2 of Fig. 1. Fig. 3 is a perspective view of the breaker. Fig. 4 is a modified form of breaker.

Referring to the drawings by reference characters, similar letters of reference indicating corresponding parts in the different views, I will set forth in detail the structural features of my invention.

The churn comprises a metallic receptacle A substantially of cylindrical form and having a dome inlet H closed by a cover D. The receptacle A is provided with blocks or feet A, B, which support the churn when not suspended, and F is the operating handle by means of which it is reciprocated during churning. The said cylinder A is divided by a transverse partition B near one end thereof to provide a chamber C, which has an opening E and cover G therefor, and said chamber C may be filled with liquid, preferably water, to bring the contents of the churn to the proper temperature for churning. The churn is mounted in any suitable manner to permit its reciprocation, members E and F being shown in the present instance, which members may be hung from the ceiling or mounted on a suitable frame. Each chamber is preferably provided with drain cocks F to empty the liquid contents.

Heretofore it has been customary to provide churns with tempering liquid chambers arranged either entirely around the cream receptacle or at the bottom thereof, in either of which arrangements the contents of the churn is constantly subjected to the temperature of the adjacent tempering chamber. This constant contact with the walls of the tempering chambers has a deteriorating effect on the cream because of the fact that the temperature of the cream is constantly equalizing with that of the tempering liquid and consequently interferes with its churning, and I propose to overcome this defect by placing the tempering liquid chamber at only one end of the churn so that while it is being operated the cream is brought in contact with the wall of the tempering chamber only once in each circulation, and an even temperature of the cream is always maintained.

To agitate the contents of the chamber A, and break up the contents as it circulates, the dasher or breaker G' may be placed within said chamber. The said dasher G, comprises a rectangular frame of upright members connected by the cross piece D; and preferably the height of the frame is somewhat greater than the diameter of the churn so that when it is placed within the cream chamber one end will rest within the dome H and be held securely therein by the cover D. The said breaker, it will be observed, is located midway the length of chamber A, so as to act uniformly upon the contents as they are thrown back and forth by the movement of the churn.

It is obvious that changes in structure within the skill of the mechanic may be made without departing from the spirit of my invention, and I do not, therefore, limit myself to the details herein shown and described, except in so far as I am restricted by the prior art to which the invention belongs.

What I claim as new is:—

A churn comprising a cylindrical receptacle having a transverse partition extending across the same near one end only, thereby dividing the said receptacle into two unequal chambers, the longer of said chambers adapted to receive the cream, and the other serving to contain a tempering liquid, a removable breaker inserted in said cream chamber, and comprising a pair of rectangular frames secured together by cross pieces, and means for suspending said receptacle from a fixed support, said means embodying independent supporting members mounted to provide a curvilinear movement to the churn body with the latter in an approximately horizontal plane throughout the movement, thereby causing the cream to rush past said breaker and dash against the ends of the cream chamber, whereby the cream is brought into contact with the partition between the chambers once in each circulation of the cream from one end of its chamber to the other, and thus properly tempered.

In testimony whereof I have hereunto set my hand in presence of two subscribing witnesses.

JOHN R. SIMS.

Witnesses:
A. H. ENGLISH,
PETE L. GORDY.